Oct. 25, 1938.  E. A. HOSKYNS  2,134,515
VEHICLE BODY SUSPENSION
Filed Nov. 15, 1935   2 Sheets-Sheet 2
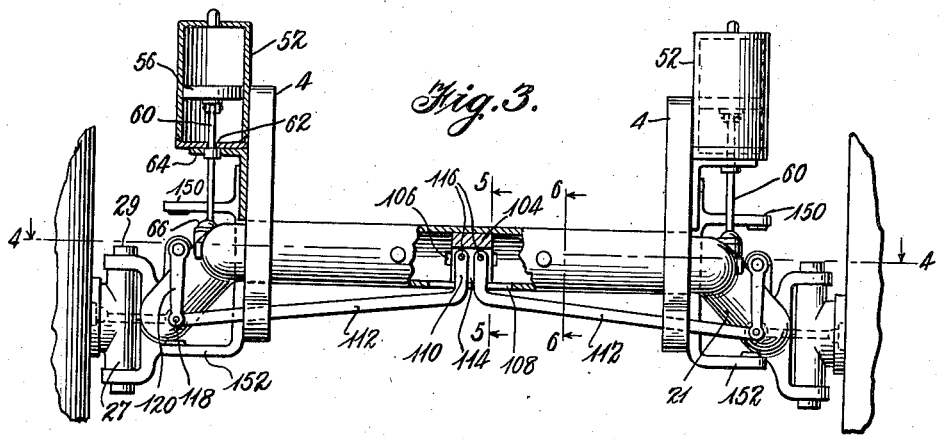
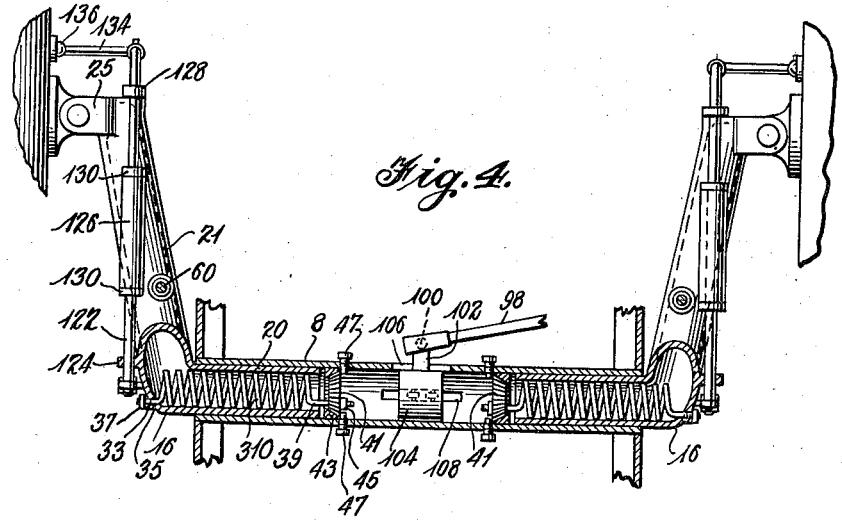
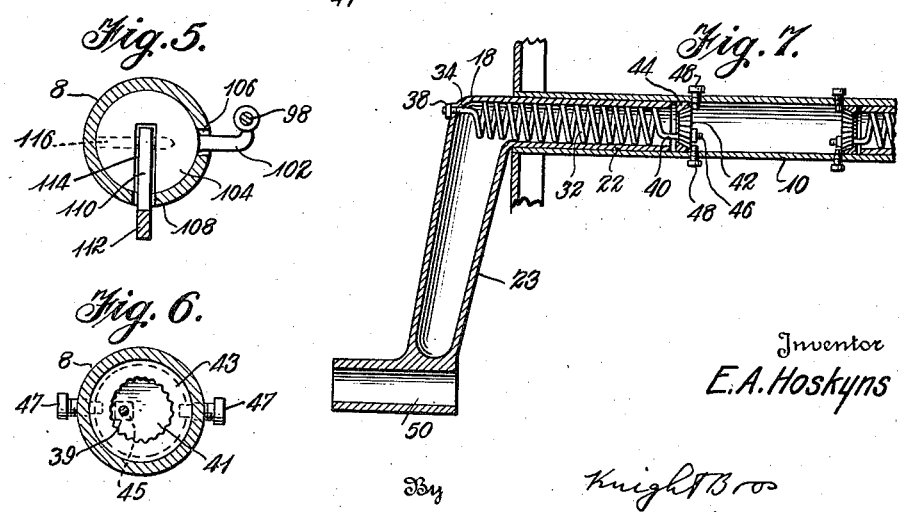
Inventor
E. A. Hoskyns
By Knight Bros
His Attorneys Patented Oct. 25, 1938

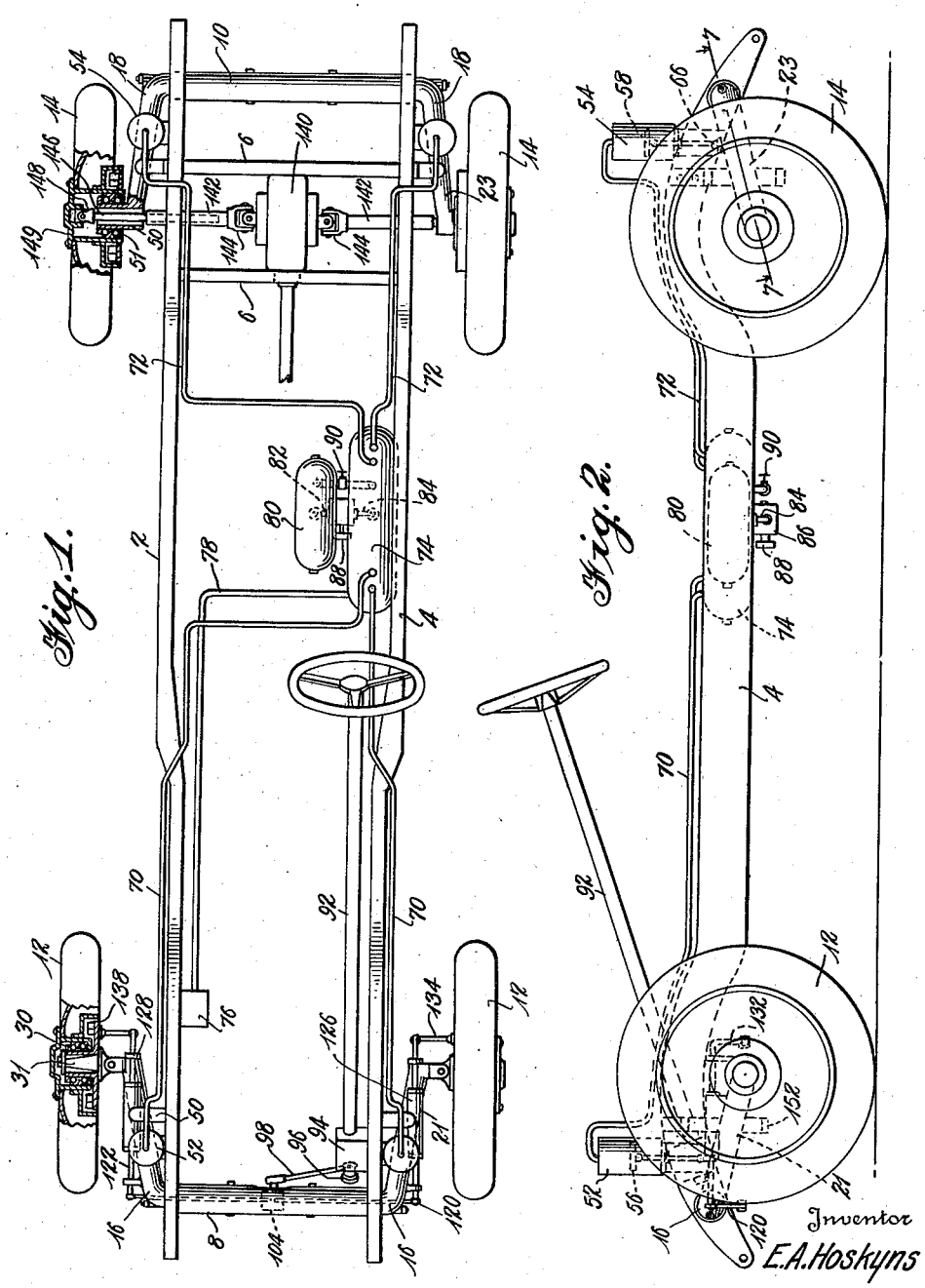

2,134,515

UNITED STATES PATENT OFFICE 2,134,515

VEHICLE BODY SUSPENSION

Edwin A. Hoskyns, Maud, Okla.

Application November 15, 1935, Serial No. 50,022

5 Claims. (Cl. 280—124)

This invention relates to vehicle body suspension and has for its primary object to provide a stabile suspension capable of absorbing the shocks to which the wheels are subjected without transmitting them to the vehicle body. This object is realized by a novel combination of equalized pneumatic suspending means and auxiliary stabilizing means.

A further object is to provide connections between the wheels and the frame of the vehicle which will positively guide the up and down movement of the wheels while permitting each wheel to move independently of the others.

Another object is to provide an independent mounting for each wheel having great strength.

Another object is to reduce the ratio of the unsprung weight to the sprung weight of the vehicle.

Another object is to provide a pneumatic suspension for the body of a vehicle, which will take a large part, or all of the dead weight of the body, enabling comparatively soft springs to be used to control the motion of the wheels and to stabilize the body.

Another object is to provide a vehicle body suspension which can be easily adjusted to change the riding qualities.

Another object is to provide a novel steering mechanism adapted to the new form of front wheel mounting.

The invention will be further explained by reference to one illustrative form shown in the accompanying drawings, wherein—

Fig. 1 is a somewhat diagrammatic plan view of an automobile chassis (without the engine) constructed in accordance with the invention, Fig. 2 is a side elevation of the same, Fig. 3 is a front elevation, with parts in section, of the front end of the frame and its suspension means, Fig. 4 is a horizontal section on the line 4—4 of Fig. 3, Fig. 5 is a vertical section on the line 5—5 of Fig. 3, Fig. 6 is a vertical section on the line 6—6 of Fig. 3, and Fig. 7 is a section on the line 7—7 of Fig. 2.

An automobile frame is shown in Figs. 1 and 2, comprising two side beams 2 and 4 tied together by cross braces, only two of which are shown at 6. The beams 2 and 4 are further tied together by tubular bearing members 8 and 10 near the front and rear ends respectively. These bearing members are for mounting the wheels upon the frame, in a novel manner which I consider best suited to the main purpose of my invention. The wheels 12 and 14 are all mounted upon hollow bent shafts, or wheel arms, 16 and 18, each of those at the front comprising two angularly related arms 20 and 21, and at the rear 22 and 23. The arms 20 and 22 are journaled in the ends of bearings 8 and 10, while the arms 21 and 23 bear at their free ends means for mounting the wheels thereon. At the front end, the arms 21 terminate in gudgeons 25 to which steering knuckles 27 are pivoted by king bolts 29. The steering knuckles bear spindles 31 upon which the wheels 12 are mounted by means of bearings 30. The journal ends 20 of the wheel arms 16 are held in the bearing tube 8 by helical springs 310. The outer ends 33 of each spring passes through a hole 35 in the shaft 16, out of line with the axis of the spring, and is fixed in place by a nut 37 screwed onto its end. The inner end 39 of each spring passes through a hole in a disk 41 which bears against a bush 43 secured fast to the inner wall of the bearing tube 8, as by welding. The end 39 of each spring is off-set from the axis of the spring. It is fixed to the disk 41 by a nut 45 threaded onto its end. The outer surface of the disk 41 and the inner surface of the bush 43 are provided with teeth to hold the disk in a fixed angular position. The disk is held against the bush by means of screws 47 threaded through holes in the tube 8. Thus the angular position of the disk 41 can be adjusted, for a purpose to be described presently.

At the rear end, the journal ends 22 of the wheel arms 18 are likewise held in bearing tubes 10 by helical springs 32. The outer ends 34 of the springs pass through holes in the wheel arms 18 and are held by nuts 38 screwed onto their ends. The inner ends 40 extend through holes in disks 42, which engage bushes 44 fixed to the inner wall of the bearing tube 10. The ends 40 are held by nuts 46 screwed upon them. The disks 42 are held against the bushes 44 by screws 48. The disks 42 can be adjusted angularly like the disks 41. The outer ends of arms 23 are formed with transverse tubular portions 50 on the outer ends of which the wheels 14 are mounted by means of bearings 51.

The weight of the vehicle body and frame 2, 4 is to be principally supported by pneumatic means. For this purpose there are attached to the side beams 2 and 4 of the frame, cylinders 52 and 54, within which are guided pistons 56 and 58. To the pistons are hinged connecting rods 60, which extend freely through holes 62 in the bottom of the cylinder and through brackets 64 upon which the cylinders are mounted. The lower ends of the connecting rods are hinged at 66 to the arms 21 and 23 of the wheel arms. Thus the pistons 56 and 58 move up and down in the cylinders as the arms 21 and 23 swing upon their journal arms 20 and 22. The cylinders 52 and 54 are each connected by pipes 70 and 72 to a common equalizing chamber 74. The pipes 70 and 72 and the equalizing chamber 74 form communicating means which freely equalize the pressure in all the cylinders 52 and 54 at all times. Air can be pumped into the chamber 74 through a pipe 78 by a pump 76 driven by the engine. The pump can be controlled in any suitable way to maintain a substantially constant, though adjustable, pressure in the chamber 74.

The pressure in the pneumatic suspension system is preferably adjusted to be substantially capable of sustaining the entire load of the vehicle body. Since the cylinders 52 and 54 are all in communication with each other, the pneumatic system would permit the body to tilt to one side or the other, but this is prevented by the springs 310 and 32, which stabilize the body. Since the ends of the springs are fixed to the shafts 16 and 18 and the disks 41 and 43 in off-set relation to the axes of the springs, swinging of the arms 21 and 23 about the axes of the bearings 8 and 10 in either direction from the angle at which the springs are unflexed, flexes the springs, which therefore resist movement of the body to one side or the other. If all the springs have an initial tension, due to the pneumatic means suspending less than the full weight of the vehicle body, the body is stabilized by the balance of the springs against each other.

The combination of the springs and the pneumatic suspension makes possible a wide variation or adjustment to suit conditions or preferences. Thus the relation of the size of the equalizing chamber 74 to the cylinders 52 may be so large that movement of the pistons in the cylinders produces no substantial increase in the pressure within the pneumatic system. In this case, the piston will not meet with an increasing resistance as it approaches the top of the cylinder, but will simply work against a substantially uniform pressure during its movement, without any perceptible shock being transmitted to the vehicle body. Though the wheel moves the piston down and up on running over depressions and bumps, air flows freely in and out of the cylinder to maintain a substantially constant pressure sustaining the vehicle body. Therefore, the vehicle body has no tendency to follow the movement of the wheel, so far as the action of the pneumatic suspension is concerned. The swinging of the wheel arms does transmit forces to the vehicle frame through the springs 310 and 32, but since these springs are substantially unflexed, these forces are largely absorbed by the springs and not transmitted to the frame.

If the equalizing chamber is made smaller so as to be nearer the size of the cylinders, then movement of a piston upward in a cylinder will substantially increase the pressure in the system and the piston will meet an increasing resistance, affording a more positive control of the wheel arm. In this case, the vehicle frame will be subjected to a change in the forces acting upon it, but since the pressure in the whole system increases at the same time, the force will be transmitted to all four corners of the vehicle and will raise the vehicle body evenly. Furthermore, since the inertia of the whole vehicle body resists each force applied by a change in pressure caused by movement of any wheel, the responsive movement of the vehicle is far less than where only a fourth of the inertia of the vehicle body resists the forces from each wheel. Straight up and down movement is also less objectionable than pitching and swaying movements.

I have provided means for easily adjusting the comparative size of the air space within the equalizing chamber 74 and within the cylinders. Beside the equalizing chamber 74 is an oil chamber 80 connected with the bottom of chamber 74 by pipes 82 and 84, between which is inserted a pump 86. By operating handle 88 of the pump, oil can be forced from the chamber 80 into the chamber 74 to reduce the size of the air space in the latter chamber. The handle 88, can of course, be arranged to be operated in any convenient way from the driver's seat, or a power driven pump may be used. A by-pass valve 90 is provided to let the oil back into the chamber 80 to increase the size of the air space in chamber 74.

To a steering column 92 is connected by a worm gear 94, in the usual way, a steering arm 96, the lower end of which is jointed to a drag link 98. The opposite end of the drag link is jointed to a ball 100 on the end of an arm 102 of a block 104 sliding in the center of bearing tube 8 between the disks 41. The arm 102 extends through a slot 106 in the side of the bearing tube and in the bottom of the tube is a second slot 108 through which extend the upturned ends 110 of tie rods 112. These ends 110 extend into a vertical slot 114 in block 104 and are pivoted therein by screws 116. The outer ends of tie rods 112 are hinged at 118 to the lower extremities of depending arms 120 fixed to rock shafts 122. The latter are journaled in bearing lugs 124, 126, 128 on the arms 21 of wheel arms 16. Collars 130 secured to rock shafts 122 prevent longitudinal motion of the rock shafts. The rear ends of the rock shafts are provided with rigid depending arms 132, to the lower ends of which are connected links 134 pivoted by ball and socket joints 136 to disks 138 fixed to the wheel spindle 31. As the block 104 is moved in tube 8 by turning the steering column 92, the tie rods 112 rock the rock shafts 122 and thereby turn the front wheels on their steering knuckles 27.

A differential housing 140 is fixedly secured to the frame of the vehicle, for instance, to the cross bars 6. Drive shafts 142 are connected to the gears (not shown) within the differential housing by universal joints 144. Shafts 142 are hollow to receive keyed shafts 146 in telescopic connection. The shafts 146 extend through hollow bores of bearings 50 with clearance and are connected at their outer ends by universal joints 148 with hubs 149 of wheels 14. In this way the drive is transmitted through a differential housing which is fixed to the vehicle frame and thereby becomes a part of the sprung weight. The unsprung weight is substantially confined to the vehicle wheels, the wheel arms, and the extremities of the drive shafts 142, 146, 148. It is well known that the riding qualities of a vehicle are improved by reducing the ratio of the unsprung weight to the sprung weight.

To keep the movement of the wheel arms within safe limits, buffers 150 and 152 are provided above and below each wheel arm, these buffers being fixed to the side beams 2 and 4.

It will be observed that a vehicle constructed in accordance with this invention has its body supported upon a cushion of air through which forces are not directly transmitted to one part of the vehicle, but such forces as are transmitted act at the four corners of the vehicle simultaneously. The stabilizing springs largely absorb forces transmitted to them, since they are under no initial stress or under comparatively slight initial stress.

An incidental advantage of the vehicle body suspension described is that it provides a means for raising the frame of the vehicle bodily in certain cases. This is highly desirable, for instance, when a driving wheel sinks so deep into a muddy gutter as to allow the vehicle frame to rest upon the solid ground at one side of the gutter. By increasing the pressure in the pneumatic system it is possible to raise the frame with respect to the wheels and perhaps force the spinning driving wheel far enough down to catch hold. In fact without increasing the pressure in the system, the pressure acting against the piston 58 will tend to force the wheel down when the weight of the vehicle frame is sustained by another support and this action in itself will tend to maintain a firm contact between the driving wheel and the ground.

Having described my invention, I claim:

1. In a vehicle, a frame, tubular bearings extending across said frame near the front and rear ends respectively, a pair of bent shafts for each of said bearings comprising angularly related arms, one arm of each shaft being journaled in one end of each bearing and each bearing having one shaft journalled in each of its ends, each shaft having a wheel mounted upon the free end of its other arm, pneumatic cushioning means between each shaft and said frame, communication means freely equalizing the pressure in all of said cushioning means, and auxiliary means for stabilizing said frame.

2. In a vehicle, a frame, tubular bearings extending across said frame near the front and rear ends respectively, a pair of tubular bent shafts for each of said bearings comprising angularly related arms, one arm of each shaft being journaled in one end of each bearing and each bearing having one shaft journalled in each of its ends, each shaft having a wheel mounted upon the free end of its other arm, pneumatic cushioning means between each shaft and said frame, communication means freely equalizing the pressure in all of said cushioning means, and auxiliary means for stabilizing said frame comprising separate helical springs within each journal arm of each of said tubular shafts, each spring having one end connected to its shaft and the other end connected to the bearing within which its shaft is journaled.

3. A vehicle as described in claim 2, wherein the connections between said springs and said bearings are adustable.

4. Vehicle body suspension means comprising a set of ground wheels; a set of cranked shafts, each bearing one of said wheels at one end and journaled at its opposite ends on the vehicle body; helical springs coaxial with the journal ends of said shafts yieldably anchoring said shafts to the vehicle body; and pneumatic cushioning means comprising expansible chambers interposed between each of said shafts and the vehicle body, and means providing free communication between said chambers to equalize the pressure in them.

5. In a vehicle comprising a frame and ground wheels, pneumatic supporting means between said wheels and frame comprising an expansible chamber at each wheel and means providing free communication between said chambers to equalize the pressure in them, said communication means including a chamber considerably larger than said expansible chambers, means for forcing a liquid into said chamber to change the size of the air space therein, and auxiliary means for stabilizing said frame.

EDWIN A. HOSKYNS.